INVENTORS
IRWIN WUNDERMAN
JOHN A. BRIDGHAM
JERRY L. RAPIER

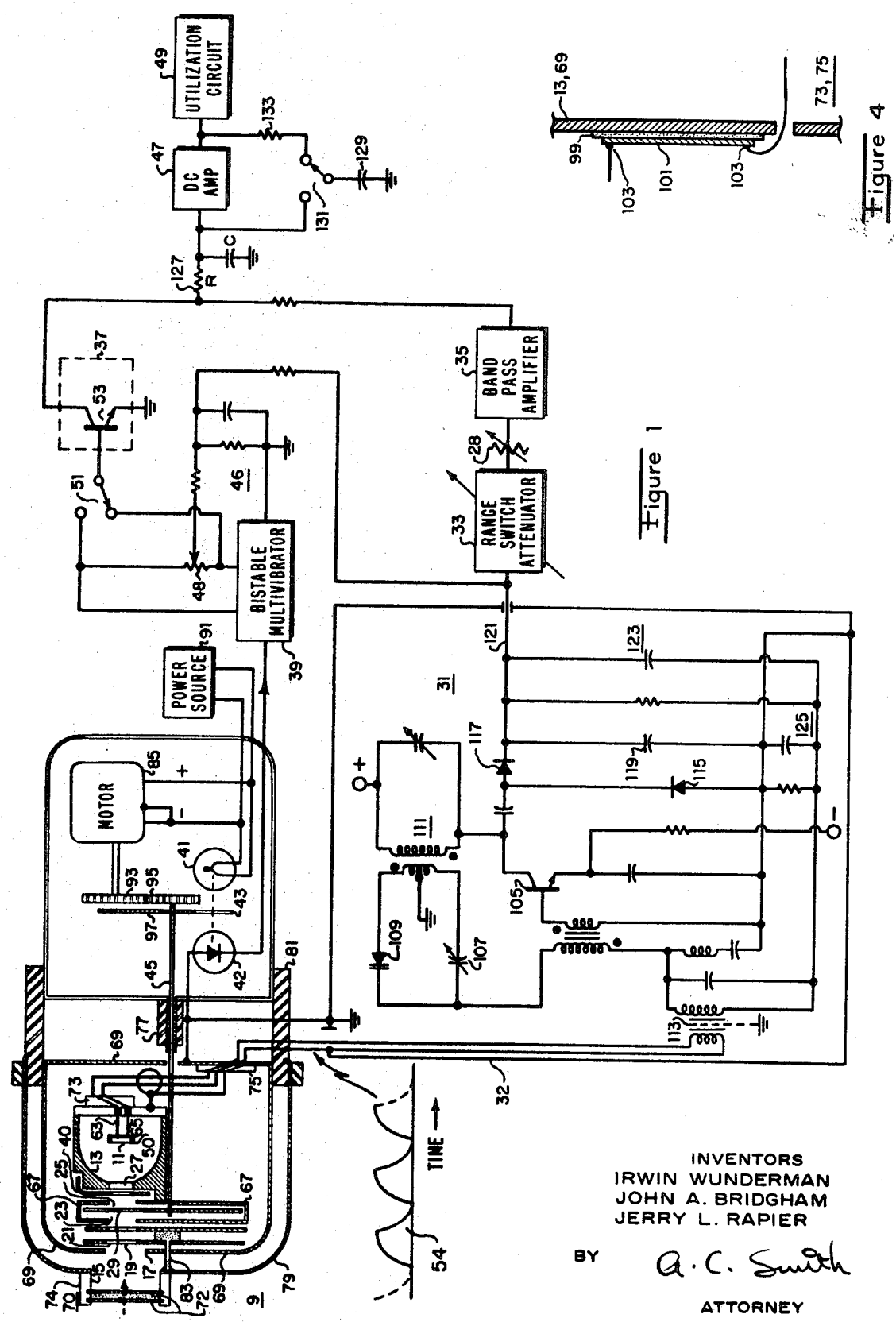

BY Q. C. Smith

ATTORNEY

United States Patent Office 3,535,523
Patented Oct. 20, 1970

3,535,523
RADIANT FLUX MEASURING APPARATUS OF THE THERMOPILE TYPE
Irwin Wunderman, Mountain View, John A. Bridgham, Palo Alto, and Jerry L. Rapier, East Palo Alto, Calif., assignors to Hewlett-Packard Company, Palo Alto, Calif., a corporation of California
Filed Feb. 1, 1967, Ser. No. 613,289
Int. Cl. G01j 5/12
U.S. Cl. 250—83.3                      11 Claims

ABSTRACT OF THE DISCLOSURE

An improved thermopile having measuring and reference thermocouple junctions disposed on the same surface is arranged within a probe to receive the radiation to be measured through apertures in isothermal barriers which surround the thermopile for producing an output from the thermopile which is representative of the difference in the rates of heat transfer of the measuring and reference junctions. Circuitry connected through thermal filters to receive the thermopile output signal provides an indication of the radiant flux measured by the thermopile over a selectable flux average period.

BACKGROUND OF THE INVENTION

Certain known radiant energy meters use a thermally-responsive element which comprises a reference element disposed in the thermal flux field of a selected or background environment from which the radiation being measured is excluded, and another similar element disposed in the field of the radiation being measured. However, the thermal flux incident upon the reference element is typically much greater than the increment of flux being measured. Thus the associated circuitry provides an output indicative of the small difference between the two very large absolute energy levels at which the elements operate. This has the disadvantage that it is difficult to make the thermal background flux identical for both elements with different fields of view and a small change in background flux which affects only one of the elements is indistinguishable in effect from a change in the radiation being measured.

SUMMARY OF THE INVENTION

In accordance with the illustrated embodiment of the present invention, a radiant-energy sensor such as a planar array of reference and measuring thermocouple elements is disposed in the flux field of radiant energy being measured. The output of the radiant energy sensor is indicative of the difference in the heat loss rates of the reference and measuring junction to a common thermal mass. The radiant energy being measured is chopping periodically by a mechanical shutter and is applied to a planar sensor of selected area containing a plurality of serially-connected thermocouple elements alternately arranged as reference and measurement elements. The surfaces of the reference elements which are typically highly reflective but which also may or may not have wavelength selective absorbtivities, are disposed in high thermally conductive relationship to a heat sink while the measurement elements having highly absorptive (or wavelength selective) surfaces are disposed in low thermally conductive relationships to the heat sink. The output signal produced by this thermopile arrangement for a given input heat rate is thus indicative of the difference in the temperatures to which the reference and measurement elements thermally equilibrate as a result of the different heat loss rates of the elements. This temperature difference thus occurs when the radiant energy being measured is at a fixed level or is periodically varied at a slower rate than the heat loss rate of the elements.

In general, however, the present invention may use any electromagnetic radiation detector, for example a photodetector, in which the radiation (photons) is detected by absorbing the energy and momentum of such radiation in a detecting medium, thereby exciting other quanta (such as phonons in a photodetector or heat in a thermal detector or electrons and holes in a quantum detector) into excited states. The resultant sensitivity of such a detector is thus dependent upon the number of such excited states that can be maintained relative to the number of states that exists under equilibrium in the absence of the input radiation signal (temperature difference in the thermal detector and excess conduction band and/or valence band—populations in the quantum detector). These excess populations (of phonons or electron holes as the case may be) in turn are dependent upon the net rate at which they are being developed, i.e., the difference between the rate at which they are generated from the absorbed signal radiation and the natural rate at which the excess populations relax back to the equilibrium state. Based on the theory of excited carried transfer, it can be shown that the wide-band signal detectivity of a radiation sensor can be enhanced by maximizing the net difference between these two rates. For the thermal detector of the present invention this is accomplished by minimizing the heat capacitance associated with the excited populations at the hot thermocouple junction and maximizing the heat capacitance associated with the cold thermocouple junction. For bulk photoconductors, the requirement is high mobility associated with each photo-generated electron and for junction photodiodes each photogenerated electron and hole should be collected to constitute a quanta of current flow in the diode. Another parameter of importance in radiation detectors is minimal drift in output for a constant radiation signal input. Drift results from variations in the number of excited states maintained for a fixed signal radiation level and from variations in the number of excited states that prevails under equilibrium conditions. The thermal detector of of the present invention includes an improved physical and electrical configuration which aids in maintaining these rates stable with time and which aids in increasing the net difference between these two rates.

BRIEF DESCRIPTION OF THE DRAWING

FIG. 1 is a schematic diagram of the preferred embodiment of the present invention; FIG. 4 is a sectional view of the thermal filters of FIG. 1.

DESCRIPTION OF THE PREFERRED EMBODIMENT

Figure 3:
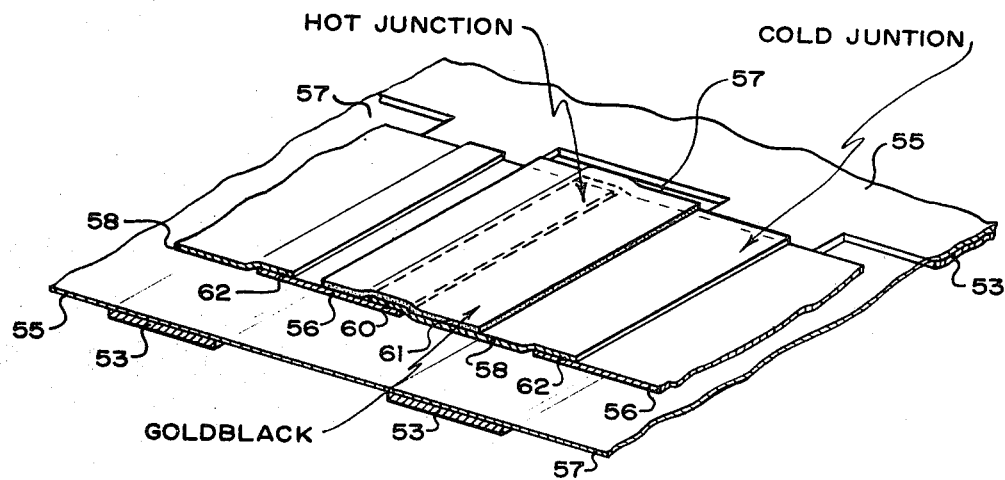
FIG. 3 is a magnified perspective view of thermocouple junctions in the sensor of FIG. 2.

Referring to FIG. 1, there is shown a radiant energy probe 9 including a radiation sensor 11 disposed in the focal plane of a hemispherical chamber 13. The chamber 13 includes an aperture or window 27 of radiation transparent material such as air, quartz, calcium fluoride, or the like. Radiant energy to be measured passes through a series of apertures 15–27 and a rotating shutter 29 and impinges upon the planar surface of the sensor 11 which may include a plurality of thermocouple junctions. Radiant energy reflected from the surface of the sensor 11 is returned to the surface by reflection from the hemispherical walls of chamber 13. The resulting electrical signal is amplified by parametric preamplifier 31, attenuator 33 and bandpass amplifier 35 and is applied to synchronous demodulator 37. This demodulator is driven on and off by bistable multivibrator 39 which is triggered by signal from element 42 in synchronism with the angular position of the rotatable shutter 29. These trigger signals are produced when light from source 41 passes through the shutter 43 which rotates on the shaft 45 with shutter 29 and periodically illuminates the light-responsive element 42. The demodulated signal is filtered by an R-C network 127, is amplified by D.C. amplifier 47 and is applied to a utilization circuit 49. Typically the utilization circuit 49 includes a meter or recorder or the like which is calibrated to provide an output indication in convenient units such as total watts or watts/cm.$^2$, intensity, radiance, irradiance, spectral irradiance, temperature, net photons input, photons/sec.$^2$, or the like, incident upon (or radiated by) the sensor 11. Switch 51 reverses the phase of synchronizing the signal applied to the demodulator 37 in order to produce upscale indications when the net radiant energy transfer is from external sources to the sensor 11 (i.e. measurement of a relatively hot body) as well as when the net radiant energy flow is from the sensor 11 toward external source (i.e., measurement of a relatively cold body).

Figure 2:
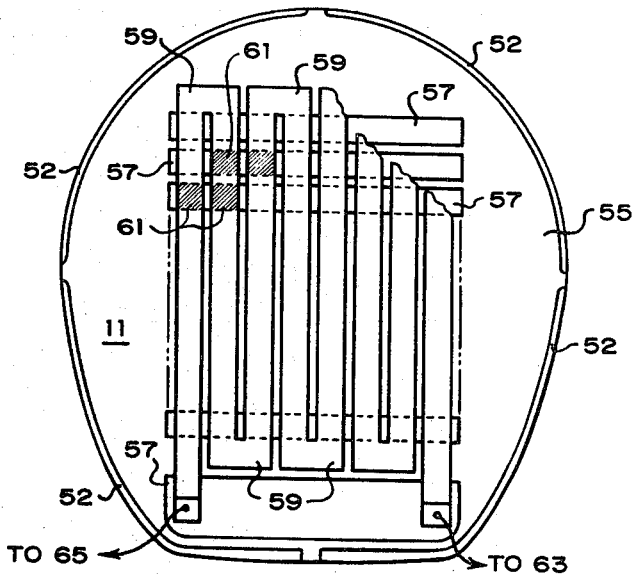
FIG. 2 is a plan view of the radiant energy sensor of FIG. 1.

Referring now to FIGS. 2 and 3, the radiant-energy, thermopile sensor 11 includes an aluminum foil and other thermally conductive substrate 53 about one mil thick having an oxide layer 55 such as $Al_2O_3$, $SiO_2$, etc. about 1000 angstroms thick on the upper surface. Longitudinal regions 57 are etched in the aluminum foil from the underside to form parallel arrays of windows 57 covered only by the oxide layer 55. The serpentine-shaped conductive path 59 is formed as a plurality of serially-connected thermocouples of such materials as bismuth-antimony or silicon-germanium or iron-constantan, or the like. Each thermocouple includes a layer of bismuth 56 which is vapor-deposited onto the aluminum oxide surface to extend in the direction of the conduction path from an edge of one window 57 across a fractional portion of the width of the adjacent land of aluminum 53 and across a fractional portion of an adjacent window 57. A layer of antimony 58 is then vapor-deposited over the bismuth 56 and over the remaining portion of the window 57 to form a pair of bismuth-antimony junctions, one disposed over the window 57 and the other disposed over the aluminum land 53, thereby completing the series connection of junctions in the serpentine-shaped conductive path. A radiation-absorbing layer of goldblack, carbon black, spectrally-selective absorptive material, dye, or the like 61 is then deposited only over the junctions 60 disposed over the windows 57 while the remaining junctions 62 disposed over the aluminum lands 53 may be left untreated or may be covered with a reflective or spectrally-selective reflective material. The aluminum or the substrate material may be removed substantially about the peripheral edge leaving only the peripheral edge of oxide film 52 where it is desired to thermally isolate the substrate from the peripheral support means 50 (e.g. where the substrate temperature is to be monitored or controlled). Alternatively the substrate may be thermally coupled to the surrounding chamber 13 through the support means 50 so that the sensor structure 11 and chamber 13 equilibrate toward the same temperature.

In another embodiment of the invention, the aluminum substrate includes spaced apertures through which the surface-covering layer of oxide extends in the form of a cone with the apex thereof disposed below the thermopile active surface. Junctions corresponding to the "hot" junctions 60 of FIGS. 2 and 3 are then formed over the inner apex and the entire inner cone surface may be coated with a radiation-absorbing material. The remaining planar surface about the cone apertures supports the "cold" junctions 62 in an arrangement similar to that shown in FIGS. 2 and 3 so that they are thus in high thermally conductive relationship to the thermal mass of the substrate.

Thus the hot junctions 60 and the cold or reference junctions 62 is either embodiment are all disposed within the field of the radiant energy to be measured which passes through the series of apertures in the probe 9 of FIG. 1. The thermoelectric EMF's at each of the junctions combine in conduction opposition so that the net current flow in the support leads 63, 65 is indicative of the average difference in temperatures between the hot and cold junctions along the conductive path 59 due to incident radiant energy. It should be noted, however, that where the incident radiant energy is chopped, say at about a 15 hertz rate as by the rotating shutter 29 of FIG. 1, the resulting current in leads 63, 65, as shown by waveform 54, is indicative of the difference in temperatures to which the hot and cold junctions 60, 62 equilibrate in response to the periodic incident radiant energy. This is because the hot junctions 60 disposed over the window 57 are thermally coupled to the aluminum land sinks 53 only laterally along the low thermally conductive thin layers of aluminum oxide 55, bismuth 56 and antimony 58 and accordingly approach a higher temperature for a given heat input rate, while the cold or reference junctions 62 are highly thermally coupled to the same heat sinks 53 directly through the thin layer of aluminum oxide 55, and do not approach as high a temperature. Because of the small thermal masses, small heat capacitances, and heat flow rates achievable in the present sensor configuration, thermopiles according to the present invention may approach over-all response times as low as seventeen microseconds and typically have response times of the order of a few milliseconds. Thus, where the radiant energy to be measured, for example, from a relatively hot body is periodically applied to the sensor 11 with a repetition rate of about 15 hertz, as determined by the rotating shutter 29, then the hot and cold junctions equilibrate in about four milliseconds at different temperatures for each radiation transmission condition of the rotating shutter 29. The output signal 54 from the sensor 11 thus varies with time between two signal amplitudes in synchronism with the chopping rate of the shutter 29 and the signal amplitudes are indicative of the temperature differences between the hot and cold junctions when a given level of radiant energy is passed by the shutter 29 and when the incident radiant energy is blocked by the shutter 29.

Special precautions are required to avoid the application to the hot and cold junctions of the sensor 11 of different increments of radiant energy from external sources other than the source to be measured. Thermal gradients, for example, with respect to the sensor 11 as well as thermal conduction paths to the sensor 11 from the outside environment which might result in differential heating of the junctions (or in the periodic variations in the heating thereof) are greatly reduced by the probe design of the present invention. The thermopile of hot and cold junctions 60, 62 may be either thermally isolated from or thermally coupled to adjacent thermal masses by its peripheral mounting, as previously described, and is disposed within the thermally conductive hemispherically-shaped chamber 13 to insure thermal equilibrium under the influence of all sources of radiation, conduction, convection, and acoustic heating which are omnidirectionally disposed about the sensor 11. The enclosing chamber 13, the shutter housing 67 which is thermally coupled to the chamber 13, and the shutter plate 29 which rotates in close spaced relationship to the walls of housing 67 are then all thermally isolated from the external environment. The close spacing of the shutter plate to the walls of the housing 67 aids in thermally coupling the shutter wheel 29 to the housing 67 and chamber 13 by thermal conduction, convection, and radiation in air and thus insures that the shutter plate, when in position over apertures 25, 27 is also at the same radiation temperature as the rest of the radiating surfaces about the sensor 11. These surfaces operating at substantially the same temperatures can be of a similar material, say aluminum, so that their effective radiation emissivities at the same temperatures are substantially equal. The aperture element 40 is adjustable along the direction of alignment of apertures 15–27 for altering the field of view of the sensor 11. This permits calibration of the instrument in units of intensity (i.e. watts/steradian) for radiation from a large area source which floods the field of view of the sensor 11 as determined by element 40, as well as calibration of the instrument in units of irradiance (i.e. watts/cm.²) for radiation from a small source. The space between the aperture element 40 and housing 67 is provided for receiving apertures of selected shape or for receiving wavelength- or intensity-selective filters of desired characteristics.

The chamber 13 and housing 67 are mounted inside a thermally conductive housing 69 using thermally insulating materials and the electrical conductors 71 leading into the sensor 11 from the outside environment pass through two stages of thermal filtering 73, 75 as shown in FIG. 4. In addition, bearings 77 for the shutter wheel 29 on shaft 45 are located outside housing 69 to eliminate frictional heating and acoustical vibration and heating inside the housing 69. Also, shaft 45 is plastic or other low thermally conductive material to eliminate thermal coupling from the outside environment into the housing 69. An outer housing 79 is also disposed around the housing 69 to prevent unnecessary heating of the housing 69 due to handling of the probe assembly 9. This outer housing 79 is rotatably mounted in thermally insulating material 81 to provide a zeroing shutter which blocks out incident radiant energy as the aperture 15 is rotated away from alignment with the remaining apertures 17–27. Also, since the outer housing may be at a different temperature than the inner housing 67 and chamber 13, at least one additional shutter 21 is arranged to rotate on the thermally insulating shaft 83 fixed to the outer housing 79 to block radiation from the outer housing 79 itself when it is rotated to the radiation zeroing position. This shutter 21 is normally disposed adjacent the surfaces of the housing 67 to insure that its temperature is substantially the same as the temperature of the housing 67 and chamber 13. Shutter 19 attached to thermally insulating shaft 83 is simultaneously rotated with shutter 21 to provide an additional radiation baffle that prevents the radiant energy from the outer housing 79 from altering the temperature of shutter 21.

The thermal filters 73, 75 for the lead-in conductors 71 are constructed as shown in FIG. 4. Each includes a substrate 99 of high transverse thermal conductance and low electrical conductivity material such as beryllium oxide, aluminum oxide, thin Mylar layer, or the like, disposed in thermal contact with a wall 13, 69 of the corresponding thermally conductive chamber or housing. Metallic conductors 101 of low longitudinal thermal conductance are provided on the outer surface of the substrate 99 by common techniques such as by vapor deposition or foil lamination. Thus, heat conduction along the signal conductors from the outside environment to the sensor 11 is eliminated by the close thermal coupling of the conductors along their lengths to the thermally conductive walls of chamber 13 and housing 69.

The power dissipating elements including motor 85 and light source 41 are dissposed within thermally conductive housing 89 which is thermally isolated from the radiation-sensitive forward portions of the probe assembly 9 by the thermally insulating material in mount 81 and shaft 45. Motor 85 is connected to receive power from source 91 for rotating the gears 93, 95, shaft 45 and the demodulator shutter wheel 43 disposed on shaft 45 intermediate the light source 41 and light-responsive element 42. The gear ratio of gears 93, 95 is typically the ratio of relatively prime numbers to provide asynchronous rotation of the shutter plate 29 and motor 85. This permits easy filter selection of the synchronous information which is repersentative of incident radiation and also prevents averaging the demodulator of motor noise and surges that might otherwise produce a D.C. offsetting signal at the output. Thus, the probe 9 and sensor 11 constructed according to the present invention may typically have an effective thermal input noise corresponding to less than $10^{-7}$ degrees centigrade variation in the hot junction and a signal sensitivity $3 \times 10^{-9}$ volts across 400 ohms for input radiation of $10^{8-}$ watts/cm.².

Since the hot and cold junctions of the thermopile are disposed in the same flux field of radiant energy being measured the probe of the present invention is capable of operating accurately over a wide dynamic range of input radiation levels, typically from $10^{-9}$ watts for detectable radiation to $10^{-2}$ watts for full scale operation. For higher levels of radiation, a radiation attenuator 70 may be provided over the apertures in line with the sensor 11. This attenuator includes a pair of spaced, radiation-transmissive windows 72 such as quartz, sapphire, calcium fluoride which may be clear or diffusively etched and which are supported in a housing 74 attached to the outer housing 79. The space between walls 72 is filled with particulate refractive scattering material such as quartz particles, quartz wool, colloidal suspensions of radiation-transmissive materials such as sapphire, quartz, or the like. Thus substantially flat attenuation of radiation is achieved in the band extending over the transmission wavelengths of the material used, typically from .25 micron to 3.5 microns for quartz. The output radiation from the window 72 into housing 74 typically has a Lambertian (cosine) angular distribution which is independent of the angular distribution of the incoming radiant energy. Hence for a very small area paraxial input beam such as from a laser the radiant flux meter of the present invention reads total beam power over the entire central region of window 72 independent of the area or shape of the input beam. Attenuation by a factor of about 100 is possible using inner wall spacing of about 0.26 inch filled with quartz particles having average size of 20 microns. Greater attenuation may be provided with greater inner wall spacing and/or smaller particle size.

The time-varying signal 54 from the sensor 11 may be extremely low level, typically of the order of $10^{-8}$ volts RMS for an input signal $10^{-7}$ watts/cm.² (i.e. within the range of values encountered for typical room temperature radiation within a narrow band of wavelengths from common surfaces). This signal is applied to the parametric amplifier 31 which is disposed within a magnetic shield 32. The amplifier 31 includes a transistor 105 arranged in a self-oscillatory circuit with a capacitor 107 and a voltage-variable semiconductor capacitor 109 connected in a bridge-like R.F. feedback path. Thus, the circuit oscillates at a frequency, typically about two megahertz, determined substantially by the tank circuit 111 connected in the collector circuit of transistor 105. The amplitude of the oscillation may be modulated at low frequencies by the signal applied through the input transformer 113 to the semiconductor capacitor 109 in the R.F. feedback path. Since the bridge circuit in the R.F. feedback path operates near balance, the carrier is partially suppressed, thus leaving the amplitude-modulated sidebands spaced about 15 hertz each side of the carrier. The equivalent noise of the signal transformed according to modulation theory down to the pass band centered about 15 hertz is thus extremely low and is typically the equivalent of a noise temperature of about 10° Kelvin at 15 hertz. The amplitude-modulated output from the transistor oscillator is detected and filtered by the network including diodes 115, 117 and capacitor 119 to produce an amplified output 121 indicative of the incident radiant energy to be measured. A portion of this output is fed back through resistor-capacitor networks 123, 125 for stabilizing the over-all amplifier gain against the effects of parameter and temperature changes.

The amplified output 121 is applied through a range-selecting attenuator 33 to band pass amplifier 35 which has a transmission characteristic centered about the shutter plate 29 chopper frequency, typically about 15 hertz. The signal amplifying channel may include a total gain adjustment element 28, for example a calibration potentiometer following attenuator 33, with a front-panel adjustment dial calibrated in units of either incremental intensity, radiance, flux, or the like or in the fourth or fifth root of emissivity for temperature measurements of emitting surfaces. Thus, the temperature of a radiating body may be indicated directly using the present invention as a result of the Stefan-Boltzman law on radiation where the sensor 11 and probe apertures are set or are imaged to respond to radiation incident on a known area and the total gain adjustment by element 28 is calibrated in units of the fourth root of emissivity of the radiating body. For radiators of metal, the calibration may be in units of the fifth root of emissivity to correct for the emissivity dependence with temperatures of most metals.

The amplified signal from the signal amplifying channel including the amplifier 35 is then synchronously demodulated by the transistor switch 53 to produce the desired D.C. output signal. The transistor switch 53 is driven on and off by a selected one of the outputs of bistable multivibrator 39. The synchronous demodulation of the amplified signal may thus be in one or the opposite phase relationship according to the setting of the switch 51. A meter of other utilization circuit 49 thus provides an upscale indication for one demodulation phase relationship on incident radiant energy from a relatively hot body and also provides an upscale indication for the opposite demodulation phase relationship on radiant energy outflow from the sensor 11 toward a relatively cold body. Also, the differential outputs of the bistable multivibrator 37 are combined in a potentiometer 48 with the adjustable tap connected through a suitable attenuator and filter 46 to the input of the range selecting attenuator 33 to supply an offsetting signal thereto of selectable phase and amplitude. This offset signal aids in zeroing out the effects of background radiation (hotter or colder than the sensor 11), thereby enhancing the dynamic range of measurement and incremental measurement capabilities when low level radiation from a source within such background is being measured.

The detection response of the present circuitry to incident radiant energy is determined substantially by the time constant of the R-C network 127 and the meter reading may be averaged over a convenient period, say one second. A much longer averaging period may be obtained by serially connecting a storage capacitor 129 (say, equal to 100 times the value of C) through a switch 131 and resistor 135 (say, equal to 1/10 the value of R) to the output of the unity-gain D.C. amplitude 47. Capacitor 129 charges with a time content of about ten seconds to the same voltage that appears at the input of unity-gain amplifier 47. In the alternate position of the switch 131, the storage capacitor 129 is connected directly to the input of the amplifier 47 to provide a much longer averaging period, typically 100 seconds. However, since the capacitor 129 is charged substantially to the average value of the signal with preceding ten second period by virtue of its previous connection to the output of the amplifier 47, the utilization circuit initially receives the ten second average of the preceding signal upon switching of switch 51 and thereafter receives the signal that varies toward the 100 second average of the input signal. The effective settling time to final reading is substantially shorter than several 100-second time-constants and typically may be less than 30 seconds. Thus, a long period average reading may be obtained in far shorter time than several of the long-period time-constants commonly required with conventional energy storage circuits.

What is claimed is:

1. Electromagnetic energy-responsive apparatus comprising:
   an element which is responsive to electromagnetic energy;
   thermally-conductive means disposed about the element to form a first chamber;
   thermall-conductive means surrounding the first chamber and forming a second chamber which is thermally isolated from the first chamber;
   at least one thermal filter thermally coupled to one of the first and second chambers, said filter including at least a pair of spaced, electrical conductors having negligible thermal conductivity along the length thereof disposed on a thermally conductive, electrically insulating base which is thermally attached to the thermally-conductive means forming said one of the first and second chambers for shunting thermal energy thereto and for electrically insulating said conductors from said one of the first and second chambers; and
   means including the electrical conductors of said thermal filter providing electrical connection to said element.

2. Apparatus as in claim 1 wherein:
   the first and second chambers include radiation-transmissive apertures disposed in alignment with said element and having selected radiation-transmission characteristics.

3. Radiation-responsive apparatus as in claim 2 comprising:
   shutter means disposed intermediate the first and second apertures to provide alternate blocking and transmission of radiant energy therethrough;
   a thermally conductive surface disposed in close, spaced relationship adjacent at least the side of the shutter means facing said element and thermally coupled to said first chamber.

4. Radiation-responsive apparatus as in claim 3 comprising:
   prime mover means disposed outside the second chamber and mechanically coupled to the shutter means through a low thermally conductive shaft for actuating the shutter means between its radiation-transmissive and radiation blocking positions;
   radiation zeroing shutter means disposed intermediate the second chamber and said shutter means thermally tied to chamber and being movable from a first position in which a third aperture therein is normally aligned with said first and second apertures to a second position in which incident radiant energy is blocked from said element, said zeroing shutter means being closely thermally coupled to said first chamber.

5. Apparatus for measuring the magnitude radiant energy comprising:
   at least a pair of radiation-responsive elements having dissimilar radiation response characteristics simultaneously disposed in the field of radiant energy being measured;
   means for periodically interrupting the radiant energy being measured by said elements; and
   circuit means connected to the pair of elements and responsive to the difference in the response characteristics of said elements to the radiant energy being measured for producing an indication of the magnitude of the radiant energy being measured.

6. Apparatus for measuring radiant energy comprising:
   at least a pair of radiation-responsive elements having dissimilar radiation response characteristics simultaneously disposed in the field of radiant energy being measured;
   a rotating shutter plate disposed to alternately and cyclically interrupt the radiant energy being measured in the field of view of said elements;
   amplifier means connected to receive the time-varying signal from said pair of elements in response to the shutter plate interruptions of the radiant energy being measured;
   a demodulator connected to receive the amplified time-varying signal at the output of said amplifier means;
   first means connected to said demodulator and responsive to the rotation of said shutter plate for operatively converting the amplified signal to a unidirectional signal of amplitude and polarity representative of the magnitude of the radiant energy being measured and the phase relationship between shutter plate rotation and amplified signal, respectively; and second means including a utilization circuit connected to provide an indication of the amplitude of the unidirectional signal of selected polarity.

7. Apparatus as in claim 6 wherein:

said amplifier means includes a signal-controlled impedance element connected to receive the signal from said pair of radiation-responsive elements and a high frequency carrier signal for modulating the carrier signal in response to changes in said impedance element; and means connected to receive the modulated carrier signal for producing an amplified output signal representative of the signal from said pair of radiation-responsive elements.

8. Apparatus as in claim 6 wherein:

said first means includes a bistate trigger circuit which produces complementary signals on a pair of outputs indicative of each operating state and which is connected to receive a signal for altering the operating state thereof in response to rotation of said shutter plate;

a switching circuit for operatively connecting the demodulator to respond to a selected one of said complementary signals; and zeroing circuit means connected to said amplifier means for applying thereto a selectable portion of the combination of said complementary signals.

9. Apparatus as in claim 6 wherein said second means comprises:

a resistor-capacitor, low-pass filter connected to receive the unidirectional signal from said demodulator;

an output amplifier connected to apply the output of said filter to said utilization circuit;

a storage capacitor of selected value relative to the value of said filter capacitor; and switching means for selectively connecting the storage capacitor to one of the input of said output amplifier and to the output of said output amplifier through a resistor of selected value relative to the value of the resistor of said filter.

10. Apparatus as in claim 6 wherein:

said amplifier means includes a gain element having first and second electrodes forming an input circuit thereof and having second and third electrodes forming an output circuit thereof;

an inductor-capacitor tank circuit connected in the output circuit of the gain element;

a coil magnetically coupled to said inductor;

said signal-controlled impedance element is a signal-controlled capacitor and is serially connected with another capacitor of substantially equal value between end terminals of said coil;

feedback circuit means connected to apply the signal from said pair of elements to said signal-controlled capacitor for unbalancing the capacitance thereof with respect to the capacitance of said other capacitor;

means connected to the input circuit of said gain element for applying thereto the signal at the common connection of said capacitors in proper phase relationship to maintain oscillations at the resonant frequency of the tank circuit and at an oscillation level which is related to the amplitude of signal from said pair of elements applied to said signal-controlled capacitor; and means connected to the output circuit of said gain element for demodulating the amplitude-modulated oscillations to provide an amplified output.

11. Apparatus as in claim 10 comprising:

feedback means connected to apply a selected portion of said amplified output to the signal-controlled capacitor in proper phase relationship to stabilize the amplitude of oscillations.

References Cited

UNITED STATES PATENTS

| | | |
|---|---|---|
| 3,164,721 | 1/1965 | Astheimer. |
| 3,028,494 | 4/1962 | Wickersham et al. ___ 250—83.1 |
| 3,354,309 | 11/1967 | Volkovisky. |

ARCHIE R. BORCHELT, Primary Examiner

U.S. Cl. X.R.

73—355

UNITED STATES PATENT OFFICE
CERTIFICATE OF CORRECTION

Patent No. 3,535,523          Dated  October 20, 1970

Inventor(s)  I. Wunderman et al

It is certified that error appears in the above-identified patent and that said Letters Patent are hereby corrected as shown below:

Column 3, line 23, "and" should read -- or --; line 75, "is" should read -- in --.

SIGNED AND SEALED
JAN 19 1971

(SEAL)
Attest:

Edward M. Fletcher, Jr.
Attesting Officer

WILLIAM E. SCHUYLER, JR.
Commissioner of Patents